United States Patent
Sanford

(10) Patent No.: US 7,837,764 B2
(45) Date of Patent: Nov. 23, 2010

(54) OXYGEN EXCHANGE MANIFOLD, SYSTEMS AND METHODS FOR INERTING A VOLATILE ENVIRONMENT

(75) Inventor: William C. Sanford, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 340 days.

(21) Appl. No.: 12/134,403

(22) Filed: Jun. 6, 2008

(65) Prior Publication Data

US 2009/0302163 A1 Dec. 10, 2009

(51) Int. Cl.
*B01D 53/22* (2006.01)
*B64D 37/32* (2006.01)
*B65D 90/44* (2006.01)

(52) U.S. Cl. ............... 95/54; 95/45; 96/4; 96/7; 96/8; 96/11; 55/385.3; 55/385.4; 244/118.5; 244/135 R; 220/88.3; 137/209

(58) Field of Classification Search ............... 96/4, 96/7, 8, 10, 11; 95/45, 54; 55/385.1, 385.3, 55/385.4; 244/118.5, 135 R; 220/88.3; 137/209
See application file for complete search history.

(56) References Cited

U.S. PATENT DOCUMENTS

| | | | | |
|---|---|---|---|---|
| 6,478,852 B1* | 11/2002 | Callaghan et al. | | 95/54 |
| 6,585,192 B2* | 7/2003 | Beers | | 95/54 |
| 6,634,598 B2 | 10/2003 | Susko | | |
| 6,997,013 B2* | 2/2006 | Jones | | 244/118.5 |
| 6,997,970 B2* | 2/2006 | Crome | | 95/8 |
| 7,152,635 B2 | 12/2006 | Moravec et al. | | |
| 7,175,692 B2 | 2/2007 | Schwalm | | |
| 7,179,322 B2* | 2/2007 | Lyons et al. | | 95/54 |
| 7,296,399 B2 | 11/2007 | Hoff, Jr. | | |
| 7,517,388 B2* | 4/2009 | Jensvold | | 95/54 |
| 2004/0065778 A1* | 4/2004 | Jones | | 244/135 R |
| 2006/0080967 A1* | 4/2006 | Colket | | 60/777 |
| 2007/0062371 A1* | 3/2007 | Eilers | | 95/138 |
| 2008/0017248 A1* | 1/2008 | Massey et al. | | 244/135 R |
| 2008/0168798 A1* | 7/2008 | Kotliar | | 62/640 |

* cited by examiner

*Primary Examiner*—Jason M Greene
(74) *Attorney, Agent, or Firm*—Armstrong Teasdale LLP

(57) ABSTRACT

An oxygen exchange manifold converts oxygenate air into an oxygen depleted air stream for use in inerting an otherwise flammable environment. A system including the oxygen exchange manifold may be utilized to inert fuel tanks of an aircraft or another environment. Methods of inerting such environments are also disclosed.

18 Claims, 4 Drawing Sheets

OXYGEN EXCHANGE MANIFOLD, SYSTEMS AND METHODS FOR INERTING A VOLATILE ENVIRONMENT

BACKGROUND OF THE DISCLOSURE

The field of the disclosure relates generally to inerting methods and systems to reduce oxygen concentration levels and a concomitant risk of flammability for volatile environments, and more specifically to fuel tank inerting methods and systems for aeronautical vehicles.

In a variety of industries involving highly volatile materials and environments, reducing volatility of the environment and susceptibility to combustion events is a significant concern. To that end, methods and systems have been developed to provide inert gas environments that dramatically reduce, if not eliminate altogether, volatility of the environment. For example, fuel tank systems of modern aircraft are now required by the Federal Aviation Administration (FAA) to include fuel inerting systems. Such fuel inerting systems introduce inert gas in the empty space over the fuel in the tanks, sometimes referred to as ullage, to reduce, if not avoid, a likelihood of volatile conditions in the fuel tanks.

On-board inert gas generating systems for aircraft are known. Existing inert gas generating systems however, are quite complicated, expensive to implement and maintain, and have not proven completely satisfactory in use.

BRIEF DESCRIPTION OF THE DISCLOSURE

In one aspect, an oxygen exchange manifold for inerting a volatile environment is disclosed. The oxygen exchange manifold comprises: a body defining an oxygen exchange chamber; and a selectively permeable gas membrane situated in the oxygen exchange chamber, wherein the body and the selectively permeable gas membrane collectively define an oxygenated airflow passage and a deoxygenated airflow passage separated by the selectively gas permeable gas membrane. Only selected constituents of the atmospheric airflow passage may pass from the oxygenated airflow passage through the selectively permeable gas membrane to the deoxygenated airflow passage.

Optionally, the selectively permeable gas membrane is substantially planar. The selectively permeable gas membrane may be configured to permit diffusion of oxygen through the membrane from the oxygenated airflow passage to the deoxygenated airflow passage. The selectively permeable gas membrane may comprise a porous polymer membrane allowing selected gases to diffuse through the membrane from the oxygenated airflow passage to the deoxygenated airflow passage, while preventing non-selected gases from diffusing through the membrane from the oxygenated airflow passage to the deoxygenated airflow passage. Multiple selectively permeable gas membranes may be provided, with each respectively separating an oxygenated airflow path from a deoxygenated airflow passage. The oxygenated airflow path and the deoxygenated airflow passages are directed through the oxygen exchange chamber in opposite directions. The volatile environment may be an ullage of an aircraft fuel tank.

In another aspect, a fuel tank inerting system is disclosed. The inerting system comprises: an oxygen exchange manifold defining an oxygen depleted airflow path and a normal oxygenated airflow path; and a selectively gas permeable membrane in the manifold and separating the oxygen-depleted airflow path from the normal oxygenated airflow path; wherein the oxygen depleted airflow path and the normal oxygenated airflow path are passed through the manifold in opposite directions, thereby creating partial differential pressures on each side of the gas permeable membrane and diffusing force causing oxygen to pass from the normal oxygenated path to the oxygen depleted path.

Optionally, a fuel tank ullage may be placed in communication with the normal oxygenated airflow path exiting the oxygen exchange manifold. The oxygen depleted path may be in fluid communication with a combustion exhaust or a catalytic converter, and a heat exchanger may be in communication with the depleted-oxygen airflow path. The manifold may define a plurality of airflow paths and a plurality of gas permeable membranes. The gas membranes may be substantially planar, and may comprise porous polymer membranes. The system may be an on-board inerting system for a fuel tank of an aircraft.

In still another aspect, a method of inerting a volatile environment is disclosed. The method comprises: providing an oxygen exchange manifold having an oxygen exchange chamber and a gas permeable membrane separating at least a first airflow path and a second airflow path; placing the first airflow path in communication with oxygenated air; placing the second airflow path in communication with deoxygenated air; and passing the oxygenated air and the deoxygenated air through the oxygen exchange chamber, wherein the oxygenated air becomes oxygen depleted when passed through the oxygen exchange chamber and wherein the deoxygenated air becomes oxygenated when passed through the oxygen exchange chamber. The method also includes directing the oxygen depleted air from the oxygen exchange chamber to the volatile environment.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE DISCLOSURE

Figure 1:
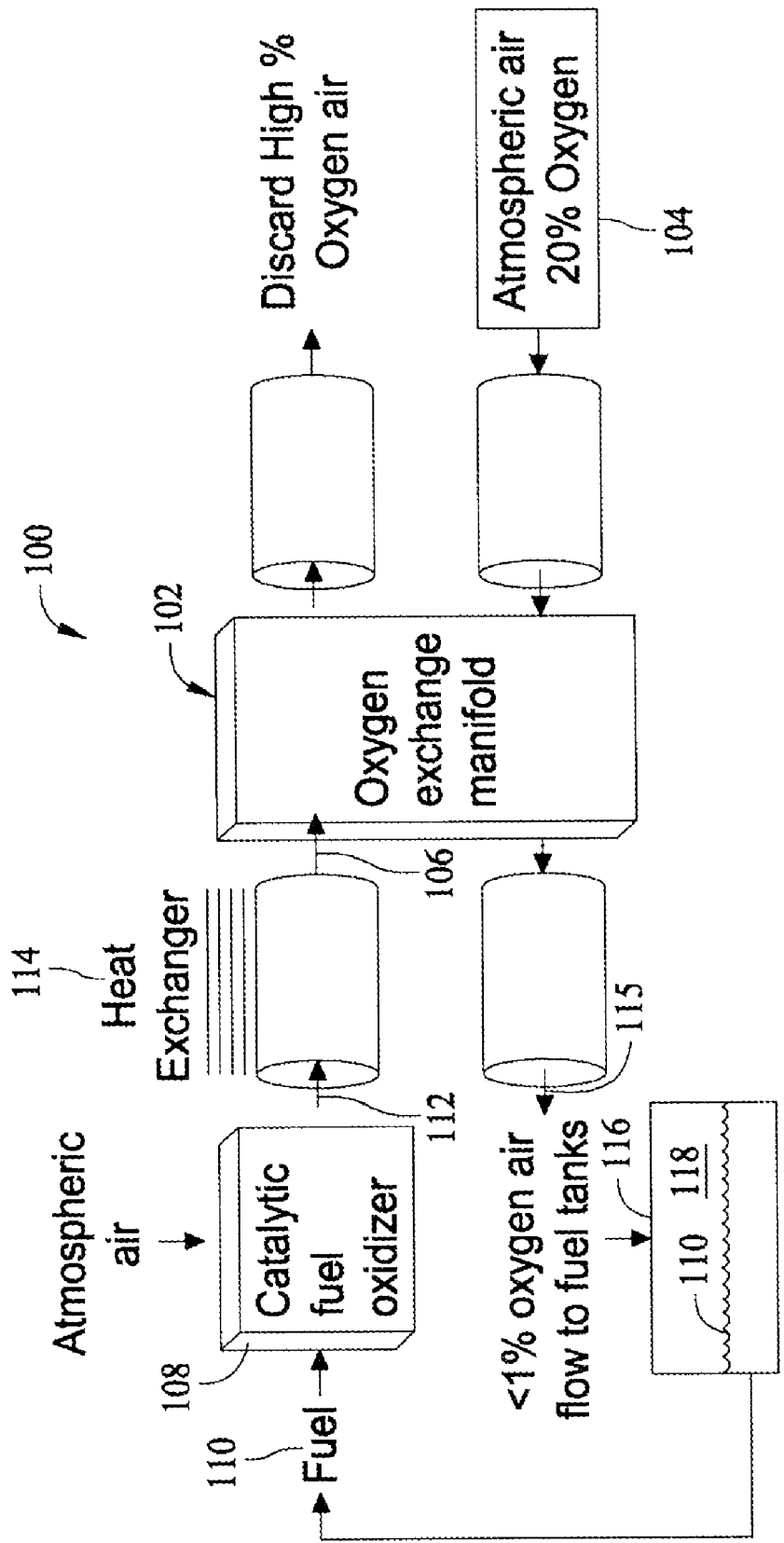
FIG. 1 is a block diagram of an exemplary inerting system for a volatile environment.

Exemplary embodiments of a systems and methods for inerting otherwise volatile and flammable environments, including but not limited to fuel tanks for military and commercial aircraft, are disclosed hereinbelow that are less complicated and less expensive than existing inerting systems for such purposes. These advantages are obtained at least in part with an oxygen exchange manifold that reduces an oxygen concentration in a non-exhaust air stream prior to being introduced into ullage in the fuel tanks.

In order to appreciate the invention to its fullest extent, the following disclosure will be segmented into different parts: wherein Part I discusses the state of the art; Part II discloses novel oxygen exchange manifolds and inerting systems, and Part III discloses exemplary methods of inerting a volatile environment.

I. Introduction to the Invention

In many industries, volatile environments and conditions exist. Inerting such environments to reduce the volatility of such environments and risk of inadvertent or accidental combustion events is desirable. Such environments and conditions may exist in, for example, mining environments, and in many different types of storage tanks and the like holding liquids or gases that are highly volatile under certain conditions.

One notable example, but not the only example, that presents such a volatile environment is an aircraft fuel tank. Empty space in the fuel tank above the aircraft fuel, referred to as ullage, has become a concern due to its potential to ignite. As a result, fuel inerting is a new requirement of the Federal Aviation Administration (FAA). In general, it is now required that ullage in aircraft fuel tanks require less than 8% oxygen content in modern aircraft. Several different ways of achieving this are known, but all are disadvantaged in one or more respects.

One known fuel tank inerting system uses a molecular sieve hollow fiber membrane gas separation system to create a nitrogen enriched air stream that is designed to reduce atmospheric oxygen from an atmospheric level of about 20.9% to a level less than about 8% oxygen, a level that is considered safe for preventing ignition of fuel vapors in tanks. This system produces a gas flow of 6 Cubic Feet or more per minute using a 92% Nitrogen ($N_2$) air stream that creates this 8% oxygen environment in about twenty to thirty minutes. The hollow fiber membrane is packaged in a cylindrical cartridge to allow the maximum surface area for gas differential migration, with the system operating at high pressure. While such an inerting system may be effective, the porous fiber membranes are not widely available and servicing and maintaining such systems can be difficult. Such systems are also expensive, and can cost hundreds of thousands of dollars to install. Finally, such systems have a relatively low lifetime duty cycle and are rated, for example, to have a lifetime of about 20,000 hours, after which they generally must be replaced at substantial cost.

Another known technology for inerting a volatile environment such as a fuel tank utilizes the exhaust of a catalytic converter for inerting purposes. Such a system takes ullage gases and combusts the gaseous hydrocarbon content to create an oxygen depleted output gas, which is then returned to the fuel tank.

Such systems involving a catalytic converter tend to put too much carbon dioxide into the fuel tank, and may lead to fizzing of the fuel with changes in altitude pressure. Additionally, such systems tend to undesirably introduce hydrocarbon residues into the fuel tank along with high concentrations of carbon dioxide and water vapor and unwanted heat.

II. Oxygen Exchange Manifolds and Inerting Systems

Exemplary embodiments of oxygen exchange manifolds and inerting systems are disclosed hereinbelow that overcome these and other disadvantages in the art. While the oxygen exchange manifold and inerting system is believed to be particularly advantageous for inerting fuel tanks of an aircraft and is described in the context thereof, it is believed that the oxygen exchange manifolds and inerting systems described hereinbelow would be beneficial in other volatile environments as well. That is, nothing in the present disclosure shall be interpreted as restricting the practice of the oxygen exchange manifolds and inerting systems to aircraft fuel tank inerting applications. Other volatile environments wherein inerting is beneficial are believed to exist and would also benefit from the concepts disclosed herein. The following examples of fuel tank inerting systems and components are therefore provided for purposes of illustration rather than limitation.

Turning now to the Figures, FIG. 1 is a block diagram of an exemplary inerting system 100 for a volatile environment such an aircraft fuel tank. As depicted in FIG. 1, the inerting system 100 includes an oxygen exchange manifold 102 receiving an oxygenated air supply 104 and a deoxygenated air supply 106. The oxygenated air supply 104 may be, for example, atmospheric air containing a normal oxygen content of about 20% by composition, although other oxygenated air supplies having greater or lesser oxygen content may likewise be utilized in further and/or alternative embodiments. For example, bleed air elsewhere existing in an aircraft system, or cabin air could be used as the oxygenated air supply 104.

The deoxygenated air supply 106 may be, for example, an exhaust stream from an aircraft engine, a catalytic fuel burner, or other source of air having a much lower oxygen concentration than the oxygenated air supply 104. In the embodiment shown in FIG. 1, the deoxygenated air supply 106 may be supplied from an aircraft engine exhaust or from a catalytic converter 108 using airplane engine fuel 110 as the reducing agent. When the fuel 110 is oxidized or burned, the oxygen content of the exhaust or byproduct is an air stream 112 that is substantially depleted in oxygen. Optionally, the air stream 112 may be passed through a heat exchanger 114 prior to entering the oxygen exchange manifold 102. In another embodiment, the deoxygenated air supply 106 may be supplied from still other sources if desired.

The system 100 may be, for example, an onboard airplane fuel inerting system that provides reduced oxygen concentration atmospheric air for use as inerting gas in an aircraft fuel tank or tanks 116. The oxygen exchange manifold 102, as described below, operates so that the oxygenated air stream 104 becomes an oxygen depleted air stream 115 exiting the manifold 102. The oxygen depleted airstream 115 is usable for inerting aircraft fuel tanks 116 by introducing the oxygen depleted air stream 115 into the ullage 118 of the tank 116 above the fuel 110. As such, the oxygen concentration of the ullage 118 above the fuel 110 is reduced from, for example, a normal atmospheric 20% oxygen composition to a level that is less than about 1%, for example, to provide an inert environment in the aircraft fuel tanks 116 to reduce the probability of flame ignition.

Additionally, the oxygen exchange manifold 102 operates, as also explained below, so that the deoxygenated air supply 106 becomes oxygenated as it exits the oxygen exchange manifold 102 and is vented or otherwise released into the ambient atmosphere. In contrast to existing systems, the deoxygenated air supply 106 is not utilized to inert the fuel tanks 116. As such, undesirable elements such as hydrocarbon residues, high concentrations of carbon dioxide, water vapor and unwanted heat, are not introduced into the fuel tanks 116 where they may negatively affect the fuel 110 in the tanks 116.

Figure 2:
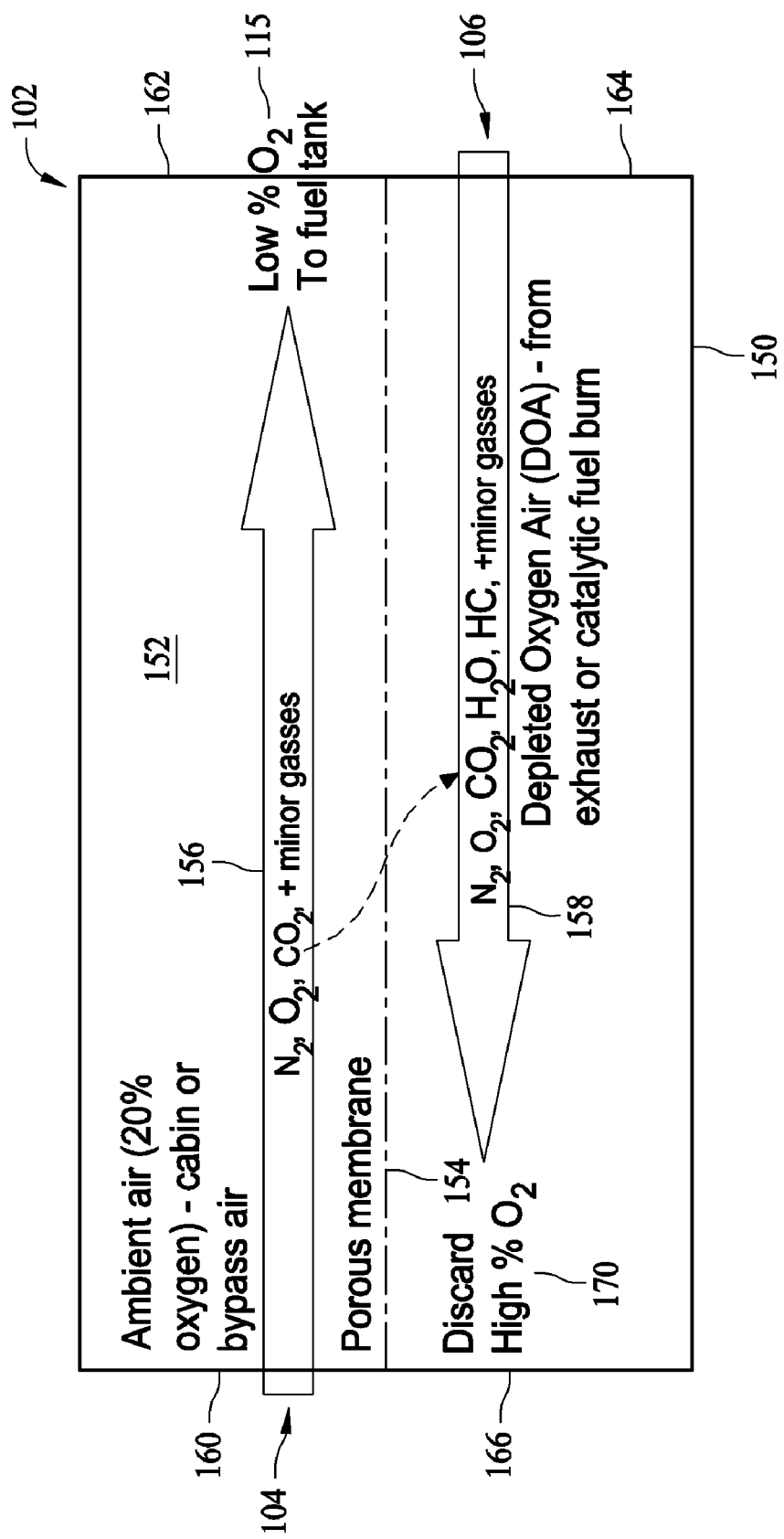
FIG. 2 schematically illustrates an exemplary oxygen exchange manifold for the system shown in FIG. 1.

FIG. 2 schematically illustrates an exemplary oxygen exchange manifold 102 for the system 100. The manifold includes a body 150 defining an oxygen exchange chamber 152 therein, and a selectively permeable gas membrane 154 in the oxygen exchange chamber 152. The membrane 154 in the depicted embodiment of FIG. 2 subdivides the oxygen exchange chamber 152 into different portions defining distinct airflow paths for distinct airflow streams.

The gas permeable membrane 154 within the chamber 152 of the oxygen exchange manifold 102 may be fabricated, for example, from a known porous polymer material having a controlled pore size in the matrix, allowing the rate of diffusion of gases through the membrane 154 to be regulated. That is, depending on the actual pore size selected, only gases having molecules of approximately the same or smaller size can pass through the membrane 154. The gas permeable membrane 154 in one exemplary embodiment may be a sintered and scythed polytetrafluoroethylene (PTFE) film having an engineered porosity over a range of 0.15 u-0.6 u pore size, and may be provided with a supporting backing to support a pressure differential of about 2-4 PSI on each opposing side of the membrane 154 in an exemplary embodiment. Such suitable material to be used as the gas permeable membrane 154 is commercially available from, for example, DeWal Industries of Saunderstown, R.I. It is contemplated, however, that other materials may be appropriately used in other embodiments.

When the oxygenated and deoxygenated air supplies 104 and 106 are directed to the oxygen exchange chamber 152 in the manifold 102, an oxygenated air stream 156 is passed through the exchange chamber 152 along a first airflow path extending above the membrane 154 in FIG. 2, and a deoxygenated air stream 158 is passed through the exchange chamber 154 along a second airflow path extending below the membrane 154 in FIG. 2. In the embodiment depicted in FIG. 2, the membrane 154 separates the airflow paths of the air streams 156 and 158. Also, as depicted in FIG. 2, the air streams 156 and 158 pass through the manifold 102 in opposing directions above and below the membrane 154. That is, the oxygenated air stream 156 flows from left to right in FIG. 2 between an inlet 160 and an outlet 162 of the manifold 102, while the deoxygenated air stream 158 flows from right to left between an inlet 164 and an outlet 166. The arrangement of the manifold inlets and outlets 160, 162, 164 and 166 and the opposing flow of the airs streams 156 and 158 is sometimes referred to as a countercurrent arrangement. Such a countercurrent arrangement is believed to be beneficial as it accelerates gas exchange via the membrane 154 as explained below, but it is contemplated that in alternative embodiments a countercurrent arrangement may be considered optional.

The passage of the air streams 156 and 158 creates partial differential pressures across the membrane 154 such that molecular species of gaseous components of the air streams 156 and 158 will move at a rate that is driven by their individual partial pressures. As shown in FIG. 2, the oxygenated air stream may include nitrogen, oxygen, carbon dioxide and other minor gaseous components. The deoxygenated air stream 158 may include nitrogen, oxygen, carbon dioxide, water, hydrocarbon and other minor gaseous components.

Of note, the nitrogen components in the air streams 156 and 158 experience a nearly equal partial pressure in each of the oxygenated air stream 156 and the deoxygenated air stream 158 on opposing sides of the membrane 154, and thus no net movement of nitrogen through the membrane 154 occurs. Oxygen however, will have a composition of about 20%, for example, in the oxygenated air stream 156 and perhaps less than 1% in the deoxygenated air stream 158. Consequently, a strong diffusion driving force is generated in the chamber 152 for the oxygen to move across the membrane 154 from the oxygenated air stream 156 to the deoxygenated air stream 158. Thus, as the air streams 156 and 158 pass through the chamber 152, oxygen flow through the membrane 154 causes the oxygenated air stream 156 to become oxygen depleted when flowing from the inlet 160 to the outlet 162, while the deoxygenated air stream 158 becomes oxygenated as it flows from the inlet 164 to the outlet 166. That is, the airstream 115 exiting the manifold 102 at the outlet 162 is oxygen depleted and ready for use to inert, for example, the fuel tank 116 (FIG. 1). The air stream 170 exiting the manifold 102 at the outlet 166, having a higher oxygen content, may be vented or otherwise released to the atmospheric environment.

It should now be evident that the manifold 102 generates a depleted oxygen air stream 115 from an oxygenated air supply 104, and in return generates an oxygenated air stream 170 from an otherwise deoxygenated air supply 106. The larger hydrocarbon molecules in the deoxygenated air supply 106 will not pass through the membrane 154 and will remain in the air stream 158 ultimately to be released to the atmosphere. Likewise, a diffusion of carbon dioxide and water vapor components in the air stream 158 across the membrane 154 will also be minimal, due to the larger molecular size of these components. Thus the primary gas movement across the membrane 154 will be oxygen diffusing from the air stream 156 to the air stream 156. Because only the air stream 156 is used to inert the fuel tank 116, hydrocarbon molecules, carbon dioxide and water molecules from the air stream 158 is prevented from entering the fuel tanks 116, together with potentially undesirable effects of hydrocarbon molecules, carbon dioxide and water molecules on fuel performance.

The heat exchanger 114 (FIG. 1) associated with the deoxygenated air supply 106 may optionally prevent excessive temperatures in the exchange chamber 152 of the manifold 102. In one embodiment, the heat exchanger 114 prevents temperatures from exceeding, for example, 160° F. to preserve the stability of the gas permeable membrane 154. It is understood that greater or lower temperature limits may be appropriate depending upon the particular construction of the gas membrane 154.

While the manifold 102 illustrated in FIG. 2 has a generally rectangular and box-like construction having a single gas permeable membrane 154 separating the air stream paths in the chamber 152, other geometrical shapes of the manifold 102 are possible, including but not limited to cylindrical shapes. Likewise, while a generally flat and planar gas membrane 154 is depicted in FIG. 2, the gas membrane 154 may alternatively assume a variety of shapes and configurations to complement the shape of the manifold 102 or to meet particular performance objectives. Additionally, it is contemplated that more than one gas permeable membrane 154 may be present in the manifold 102 if desired to more effectively promote oxygen exchange between the air streams.

Figure 3:
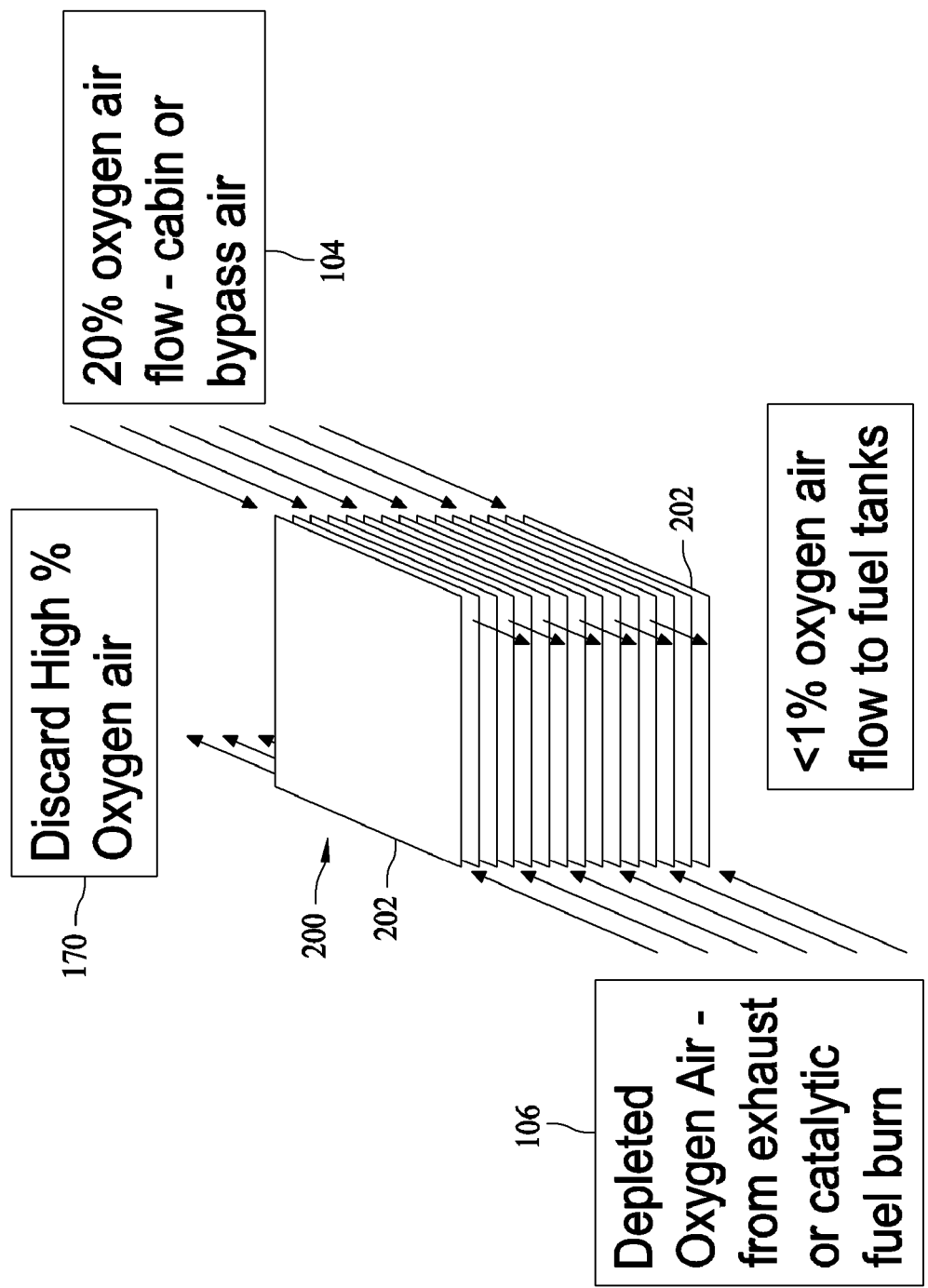
FIG. 3 represents another exemplary embodiment of an oxygen exchange manifold for the system shown in FIG. 1.

FIG. 3 represents another exemplary embodiment of an oxygen exchange manifold 200. The manifold 200 includes a plurality of gas permeable membranes 202 arranged in a vertically stacked orientation in an oxygen exchange chamber wherein airflow paths are created between the membranes 202. Similar to the manifold 102 described above, deoxygenated air 106 is passed, for example, above each of the membranes 202, and oxygenated air 104 is passed below, for example, the gas membranes 202, with oxygen diffusing from the oxygenated air 104 to the deoxygenated air 106, and ultimately producing an oxygen depleted air stream 115 that may be used to inert fuel tanks 116 (FIG. 1). An oxygenated air stream 170 is generated that is released back into the atmosphere. The membranes 202 are constructed and operate as described above in connection with the membrane 154, but operate in parallel to one another to provide more oxygen depleted air 115 for inerting the fuel tanks 116 in less time than would be possible using a single membrane.

Like the manifold 102, the manifold 200 and the membranes 202 thereof may assume a wide variety of geometric shapes and configurations to meet particular size constraints and other objectives in use. The manifolds 102 and 200 are scalable to provide appropriate amounts of oxygen depleted air for inerting purposes. Additionally, it is contemplated that more than one manifold 102 and 200 may be provided and operated in a single inerting system if desired.

The oxygen exchange manifolds 102 and 200 are believed to facilitate a much more cost effective inerting system than those that presently exist, particularly with respect to known inerting systems for commercial and military aircraft. The oxygen exchange manifolds are further believed to be reliable, longer lasting, and easier to maintain than existing inerting systems for aircraft.

III. Exemplary Method of Inerting Volatile Environments

Having now described the construction and operation of the oxygen exchange manifolds and inerting systems in detail, a method of inerting a volatile environment will now be described.

Figure 4:
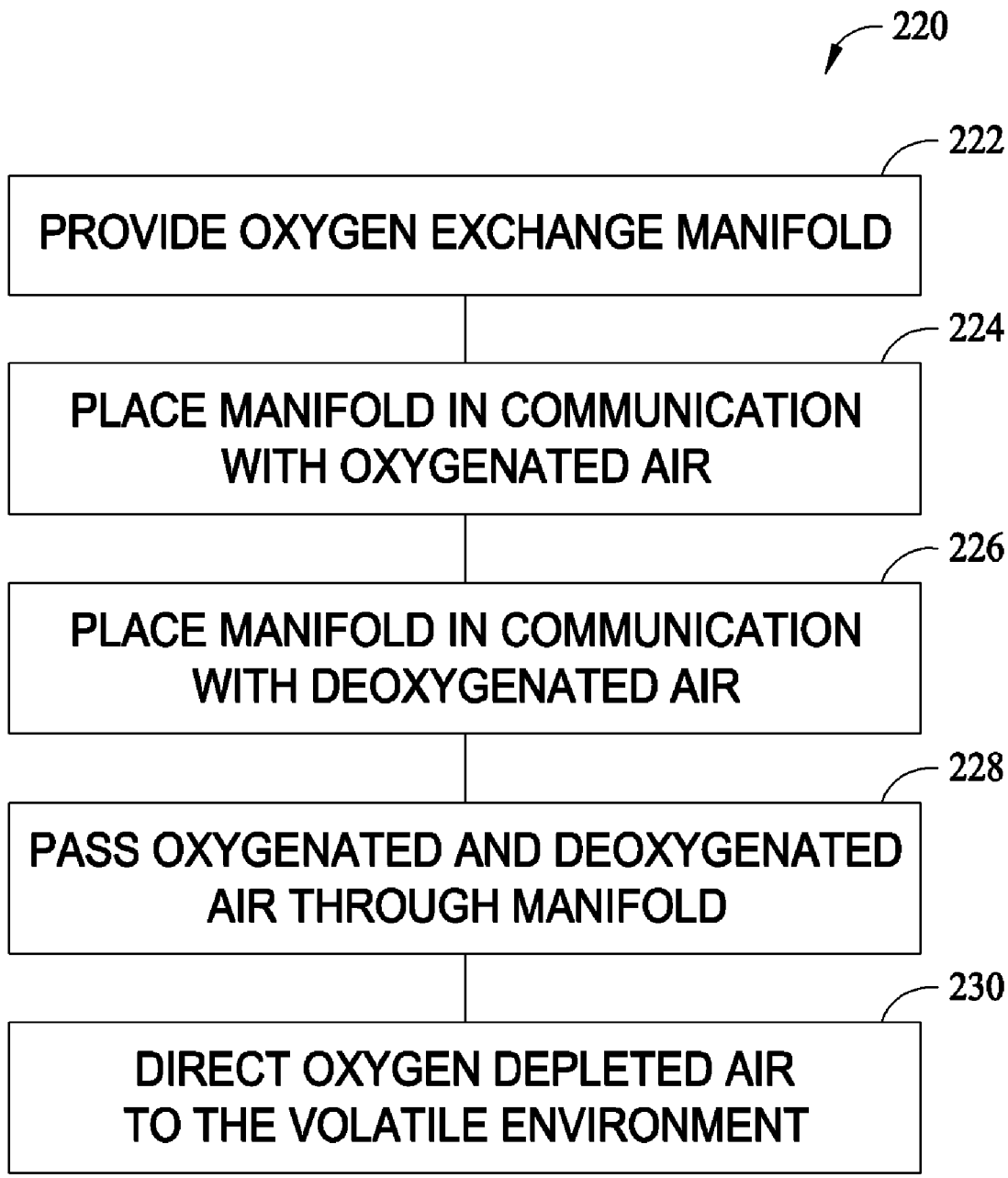
FIG. 4 is a flowchart of a method for inerting a volatile environment.

FIG. 4 is a flowchart of a method 220 for inerting a volatile environment. The method 220 includes providing 222 an oxygen exchange manifold having an oxygen exchange chamber and a gas permeable membrane separating at least a first airflow path and a second airflow path, such as the manifolds 102 and 200 described above. The method 220 also includes placing 224 the first airflow path in communication with oxygenated air, and placing 226 the second airflow path in communication with deoxygenated air. Once so connected, the method 220 includes passing 228 the oxygenated air and the deoxygenated air through the oxygen exchange chamber. As described above, by passing 228 the oxygenated air and the deoxygenated air in such a manner, the oxygenated air becomes oxygen depleted when passed through the oxygen exchange chamber and the deoxygenated air becomes oxygenated when passed through the oxygen exchange chamber. The oxygen depleted air may be directed 230 from the oxygen exchange chamber to the volatile environment for inerting purposes to reduce an otherwise volatile environment to a generally non-flammable and stable state.

As described above, placing 226 the second airflow path in communication with deoxygenated air may involve placing the second airflow path in communication with a combustion exhaust or a catalytic converter.

Optionally, passing 228 the oxygenated air and the deoxygenated air through the oxygen exchange chamber may involve passing the oxygenated air and the deoxygenated air through the oxygen exchange chamber in opposite directions, thereby creating partial differential pressures on each side of the gas permeable membrane and diffusing force causing oxygen to pass from the oxygenated air to the deoxygenated air in the oxygen exchange chamber.

Also optionally, directing 230 the oxygen depleted air from the oxygen exchange chamber to the volatile environment may involve directing the oxygen depleted air from the oxygen chamber to an ullage of a fuel tank.

IV. Conclusion

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An oxygen exchange manifold for inerting a volatile environment, the oxygen exchange manifold comprising:
    a body defining an oxygen exchange chamber; and
    a selectively permeable gas membrane situated in the oxygen exchange chamber, wherein the body and the selectively permeable gas membrane collectively define an oxygenated airflow passage and a deoxygenated airflow passage separated by the selectively gas permeable gas membrane, the deoxygenated airflow passage in fluid communication with a combustion exhaust;
    wherein only selected constituents of an atmospheric airflow may pass from the oxygenated airflow passage through the selectively permeable gas membrane to the deoxygenated airflow passage.

2. The oxygen exchange manifold of claim 1, wherein the selectively permeable gas membrane is substantially planar.

3. The oxygen exchange manifold of claim 1, wherein the selectively permeable gas membrane is configured to permit diffusion of oxygen through the membrane from the oxygenated airflow passage to the deoxygenated airflow passage.

4. The oxygen exchange manifold of claim 1, wherein the selectively permeable gas membrane comprises a porous polymer membrane allowing selected gases to diffuse through the membrane from the oxygenated airflow passage to the deoxygenated airflow passage, while preventing non-selected gases from diffusing through the membrane from the oxygenated airflow passage to the deoxygenated airflow passage.

5. The oxygen exchange manifold of claim 1, further comprising multiple selectively permeable gas membranes each respectively separating an oxygenated airflow path from a deoxygenated airflow passage.

6. The oxygen exchange manifold of claim 1, wherein the oxygenated airflow path and the deoxygenated airflow passages are directed through the oxygen exchange chamber in opposite directions.

7. The oxygen exchange manifold of claim 1, wherein the volatile environment is an ullage of an aircraft fuel tank.

8. A fuel tank inerting system comprising:
    an oxygen exchange manifold defining an oxygen depleted airflow path and a normal oxygenated airflow path, the oxygen depleted path in fluid communication with a combustion exhaust;
    a selectively gas permeable membrane in the manifold and separating the oxygen-depleted airflow path from the normal oxygenated airflow path; and
    a fuel tank ullage in communication with the normal oxygenated airflow path exiting the oxygen exchange manifold;
    wherein the oxygen depleted airflow path and the normal oxygenated airflow path are passed through the manifold in opposite directions, thereby creating partial differential pressures on each side of the gas permeable membrane and diffusing force causing oxygen to pass from the normal oxygenated path to the oxygen depleted path.

9. The inerting system of claim 8, further comprising a heat exchanger in communication with the depleted-oxygen airflow path.

10. The inerting system of claim 8, wherein the manifold defines a plurality of airflow paths and a plurality of gas permeable membranes.

11. The inerting system of claim 8, wherein the gas membrane is substantially planar.

12. The inerting system of claim 8, wherein the gas membrane comprises a porous polymer membrane.

13. The inerting system of claim 8, wherein the system is an on-board inerting system for a fuel tank of an aircraft.

14. The inerting system of claim 8, wherein oxygen depleted airflow path is in fluid communication with a catalytic converter.

15. A method of inerting a volatile environment; comprising
providing an oxygen exchange manifold having an oxygen exchange chamber and a gas permeable membrane separating at least a first airflow path and a second airflow path;
placing the first airflow path in communication with oxygenated air;
placing the second airflow path in communication with deoxygenated air;
passing the oxygenated air and the deoxygenated air through the oxygen exchange chamber, wherein the oxygenated air becomes oxygen depleted when passed through the oxygen exchange chamber and wherein the deoxygneated air becomes oxygenated when passed through the oxygen exchange chamber; and
directing the oxygen depleted air from the oxygen exchange chamber to the volatile environment.

16. The method of inerting a volatile environment of claim 15, wherein placing the second airflow path in communication with deoxygenated air comprises placing the second airflow path in communication with combustion exhaust.

17. The method of inerting a volatile environment of claim 15, wherein passing the oxygenated air and the deoxygenated air through the oxygen exchange chamber comprises passing the oxygenated air and the deoxygenated air through the oxygen exchange chamber in opposite directions, thereby creating partial differential pressures on each side of the gas permeable membrane and diffusing force causing oxygen to pass from the oxygenated air to the deoxygenated air in the oxygen exchange chamber.

18. The method of inerting a volatile environment of claim 15, wherein directing the oxygen depleted air from the oxygen exchange chamber to the volatile environment comprises directing the oxygen depleted air from the oxygen chamber to an ullage of a fuel tank.

\* \* \* \* \*